Patented Jan. 6, 1948

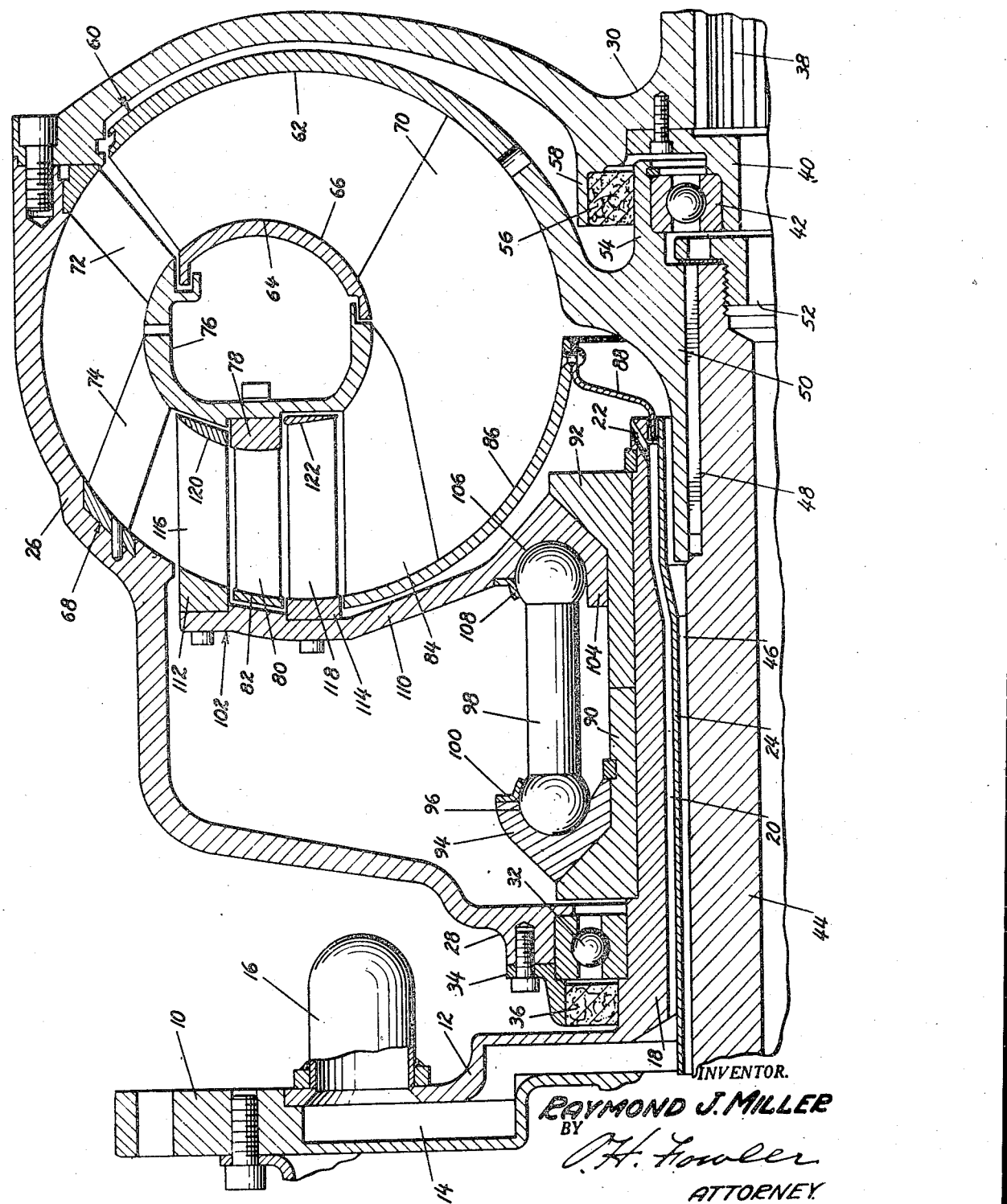

2,434,218

UNITED STATES PATENT OFFICE 2,434,218

ROTARY FLUID TORQUE CONVERTER AND COUPLING

Raymond J. Miller, Detroit, Mich., assignor to Bendix Aviation Corporation, Detroit, Mich., a corporation of Delaware Application February 4, 1944, Serial No. 521,105

2 Claims. (Cl. 60—54)

This invention relates to transmissions, and more particularly to fluid transmissions of the type generally known as fluid torque converters.

Broadly the invention comprehends an impeller for energizing fluid, a turbine for receiving energy from the fluid, and a reaction member associated with the impeller and turbine automatically operative to provide torque multiplication when required.

More particularly, the invention contemplates a fluid torque converter including an impeller and a turbine providing in conjunction with one another a toroidal channel for the circulation of fluid, and a reaction member automatically movable into and out of the channel due to changes in the direction of the fluid flow.

An object of the invention is to effectively control the reaction member of a fluid torque converter.

Another object of the invention is to simplify and to increase the efficiency of the reaction member of a fluid torque converter.

Other objects and advantages of the invention will appear from the following description taken in connection with the drawing forming a part of this specification, and in which—

The single figure is a vertical longitudinal view of a fluid torque converter embodying the invention.

Referring to the drawing for more specific details of the invention, 10 represents a stationary frame having fixedly secured thereto a member 12 providing in conjunction with the frame an annular fluid chamber 14 connected as by a conduit 16 to a fluid pumping system, not shown. A sleeve 18 supported by the member 12 is internally slotted to provide a channel 20 terminating in a port 22 in the free end of the sleeve. The channel is covered by a tube 24 fitted tightly in the sleeve so as to provide a communication between the annular chamber 14 and the discharge port 22.

A rotatable housing 26 has oppositely disposed hubs 28 and 30. The hub 28 receives a bearing 32 supported on the sleeve 18, and a retaining ring 34 fixedly secured to the hub supports a fluid seal 36 for inhibiting seepage of fluid from the housing 26 past the bearing 32. The hub 30 is internally splined as indicated at 38 for the reception of a driven shaft, not shown, and fixedly secured to the hub is a bearing support 40 for the reception of a bearing 42, the purpose of which will hereinafter appear.

A drive shaft 44 mounted on suitable bearings, not shown, is extended through the tube 24 in the sleeve 18 with suitable clearance to provide an annular channel 46, the purpose of which will hereinafter appear. The shaft is splined as indicated at 48 for the reception of a hub 50 secured against displacement by a retaining nut 52. The hub has an annular flange 54 for the reception of the bearing 42 and for the support of a fluid seal 56 fitted between the hub and a flange 58 on the hub 30 for inhibiting seepage of fluid from the housing.

An impeller, indicated generally at 60, includes a web 62 supported on the hub 50 splined to the drive shaft 44, and the web has arranged thereon a plurality of blades 64 supporting an inner shroud 66.

A turbine indicated generally at 68 cooperates with the impeller 60 and provides in conjunction therewith a toroidal channel 70 for the circulation of the fluid medium. The turbine is of the three-stage type. The first stage includes two sets of vanes 72 and 74 secured to the rotatable housing 26 in spaced relation to one another, and the vanes support an inner shroud 76 cooperating with the inner shroud 66 of the impeller. The second stage of the turbine includes an inner shroud 78 fixedly secured to the shroud 76, and the shroud 78 has arranged thereon a plurality of vanes 80 supporting an outer shroud 82; and the third stage of the turbine includes a plurality of vanes 84 secured to the inner shroud 76 and supporting an outer shroud 86 having secured to its free end a ring 88 fitted in a slot in the stationary sleeve to effectively connect the fluid passage 46 to the vortex chamber 70.

The stationary sleeve 18 has fixedly secured thereon bearing races 90 and 92; and the bearing race 90 has secured thereon a ring 94 having therein a plurality of spaced sockets 96 for the reception of balls on one end of toggles 98 held against displacement by a retainer 100 suitably secured to the ring.

A retractile reaction member, indicated generally at 102, for cooperation with the impeller and turbine includes a carrier 104 mounted for rotation on the bearing 92. The carrier has a plurality of spaced sockets 106 for the reception of the balls on the other end of the toggles 98, and a retainer 108 serves to secure the balls against displacement. The overall length of the toggles 98 is such that the carrier 104 engages the shoulder on the race 92, so as to prevent the toggles from reaching a fully extended position substantially parallel to the axis of rotation and to hold the reaction member against movement.

The carrier supports a spider 110 having secured thereto outer shrouds 112 and 114, and arranged on these shrouds are spaced sets of reaction vanes 116 and 118 adapted to straddle the vanes 80 constituting the second stage of the turbine. The vanes 116 support an inner shroud 120, and the vanes 118 support an inner shroud 122. The vanes 116 are characterized in that they are streamline vanes of high lift, and are substantially overbent to quickly influence the turning moment of the fluid; and the vanes 118 are also streamline, but have a relatively low lift so as to equalize the flow stream.

In a normal operation, rotation of the impeller 60 by force transmitted through the drive shaft 44 results in energization of the fluid in the toroidal channel 70. The energy of the fluid is received by the respective stages of the turbine 68 and the reaction member 102. This results in rotation of the turbine and the consequent transmission of force through the housing 26 and the hub 30 to the driven shaft.

During this operation, the reaction vanes 116 and 118 remain in the toroidal channel, due to the fluid flow impinging on the faces thereof. This effectively provides torque multiplication for the transmission.

Upon attaining a predetermined speed of the impeller and associated turbine, the fluid flow in the toroidal channel changes, and the fluid impinges on the backs of the reaction vanes 116 and 118, and this results in automatic movement of the reaction member 102 on the bearing race 92. Because of the toggles 98, rotative movement of the reaction member 102 induces proportionate simultaneous axial movement thereof, and this results in a withdrawal of the reaction vanes 116 and 118 from the toroidal channel, whereupon, the transmission operates as a fluid coupling at approximately one to one ratio. When the reaction member 102 is in a fully retracted position, the vanes 116 and 118 extend slightly into the toroidal channel so as to render the reaction unit completely responsive, at all times, to the forces of fluid reaction.

When increased torque is required, the direction of the fluid flow in the toroidal channel again changes and the fluid impinges on the faces of the vanes 116 and 118. This results in simultaneous rotative and axial movement of the reaction member 102, and these movements of the reaction member result in the introduction of the reaction vanes into the toroidal channel. This completes the cycle of operation.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising an impeller and a turbine providing in conjunction with one another a channel for the circulation of a power transmitting fluid, a fixed support, a reaction member movable on the support into and out of the channel as the result of reaction of the power transmitting fluid, and a toggle pivotably attached to both the reaction member and the fixed support to effectively govern the reaction member.

2. A fluid transmission comprising an impeller and a turbine providing a fluid circuit in conjunction therewith, a fixed support, a reaction member movable on the fixed support, and a connecting link pivotably attached to the fixed support and connected to the reaction member whereby the latter is moved in and out of the fluid circuit in response to fluid reaction.

RAYMOND J. MILLER.

REFERENCES CITED

The following references are of record in the file of this patent:

UNITED STATES PATENTS

| Number | Name | Date |
| --- | --- | --- |
| 1,786,433 | Klimek | Dec. 30, 1930 |
| 2,222,618 | Jandasek | Nov. 26, 1940 |
| 2,377,555 | Jandasek | June 5, 1945 |